United States Patent [19]

Nakazawa et al.

[11] Patent Number: 4,685,808

[45] Date of Patent: Aug. 11, 1987

[54] METHOD OF DISCRIMINATING COLORS OF AN OBJECT

[75] Inventors: Toshiyuki Nakazawa, Tokyo; Akio Izumi, Yokosuka, both of Japan

[73] Assignee: Fuji Electric Corporate Research and Development Co., Ltd., Yokosuka, Japan

[21] Appl. No.: 848,681

[22] Filed: Apr. 7, 1986

Related U.S. Application Data

[63] Continuation-in-part of Ser. No. 757,134, Jul. 19, 1985.

[30] Foreign Application Priority Data

Apr. 5, 1985 [JP] Japan ................................. 60-71963

[51] Int. Cl.⁴ .............................................. G01J 3/51
[52] U.S. Cl. .................................... 356/416; 250/226; 356/419
[58] Field of Search ................. 356/416, 419; 250/226

[56] References Cited

FOREIGN PATENT DOCUMENTS

60-79235  5/1985  Japan .................................. 356/416
60-85339  5/1985  Japan .................................. 356/416

*Primary Examiner*—Vincent P. McGraw
*Attorney, Agent, or Firm*—Brumbaugh, Graves, Donohue & Raymond

[57] ABSTRACT

A color discrimination method and sensor is provided for determining the color of a particular object. The sensor comprises a radiation source, focusing lenses, reflecting surfaces, sharp cut filters and a photodiode for spectral sensitivity. The photodiode detects the light and converts it into electrical signals that are delivered to an amplifier, which produces signals discriminated according to color. The system can detect light within an extended wavelength range of about 440 nm to 900 nm.

5 Claims, 13 Drawing Figures

METHOD OF DISCRIMINATING COLORS OF AN OBJECT

This is a continuation-in-part of application Ser. No. 757,134, filed July 19, 1985.

BACKGROUND OF THE INVENTION

This invention relates to an apparatus and method for discriminating between colors of an object by detecting the energy of the light reflected from the object, and more particularly to a sensor for heightening the color discrimination ability.

Figure 1:
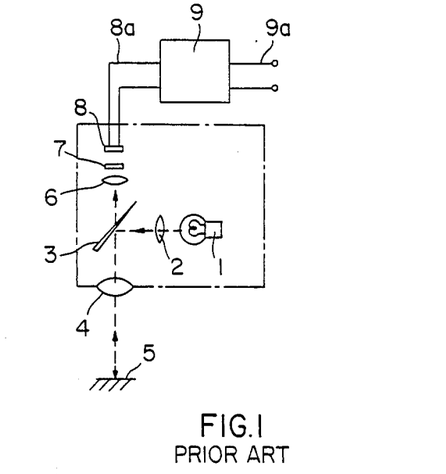
FIG. 1 is a block diagram showing the basic elements of a conventional color mark sensor.

A method of operating a sorting machine by means of a sensor which detects the color of a color mark which is present on an article has recently been adopted for the purpose of, for example, automatization of an article sorting operation. FIG. 1 shows the structure of such a conventional color mark sensor consisting of a light source 1 for radiating white light of predetermiend spectral energy, a lens 2 for converging the light which is radiated from the light source 1 and for projecting the light onto a half mirror 3, a lens 4 for converging the light which is projected from the lens 2 onto the half mirror 3 and for projecting it onto an object 5, and lens 6 for converging the reflected light of the light which is projected onto the object 5 in the above-described way after successively passing the light through the lens 4 and the half mirror 3 and for projecting it onto a visual sensitivity correction filter 7, which has a spectral transmittance approximately corresponding to its spectral luminous efficiency. A silicon photodiode 8 is used for receiving the light which has passed through the filter 7, an amplifier 9 is used for amplifying an output signal 8a from the silicon photodiode 8, and an output signal 9a is transmitted from the amplifier 9. Since the sensor shown in FIG. 1 has the above-described structure, the light which enters the phototdiode 8 through the filter 7 has a spectral energy distribution which is approximately the same as the human eye capable of recognizing the color of the object 5. The photodiode 8 detects the energy of each wavelength component in accordance with the spectral sensitivity of the diode 8, and converts the total amount of the detected energy to an electrical signal 8a. In other words, the amplified signal 9a is a signal corresponding to the total amount of the energy which is detected by the photodiode 8, and in this sensor, the color of the object 5 is identified on the basis of this signal 9a.

Figure 2:
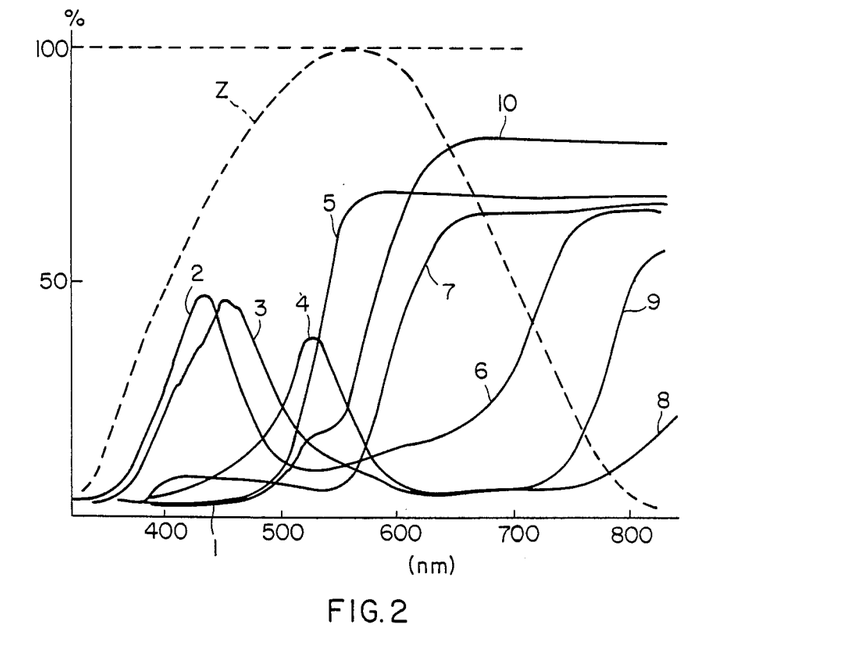
FIGS. 2 and 3 are graphs of transmittance versus wavelength for illustrating the principle of color discrimination used in the sensor of FIG. 1 for glossy and non-glossy samplles, respectiley.

The principle of color discrimination on the basis of the signal 9a shown in FIG. 1 is next explained with reference to FIG. 2. In FIG. 2, the curves in the solid lines show the spectral reflectances of objects having the respective indicated colors, and the curve Z in the dotted line shows the product of the spectral transmittance of the filter 7 and the spectral sensitivity of the photodiode 8 in FIG. 1. In the sensor shown in FIG. 1, since the object 5 is irradiated by the white light source 1, the spectral energy distribution of the light reflected from the object 5 is equal to the distribution indicated by the corresponding solid curve for the relevant color in FIG. 2. Since the reflected light is detected by the photodiode 8, as described above, the total light energy of the color of the object which is detected by the diode 8 takes the value equivalent to the value of the area which is defined by a curve obtain by multiplying the spectral reflectance of the object by the value of the curve Z in accordance with the curve for the relevant color and the abscissa in FIG. 2. Accordingly, if the energy of light detected by the photodiode 8 is different in correspondence with the color of an object, the color is identified by the signal 9a.

Figure 4:
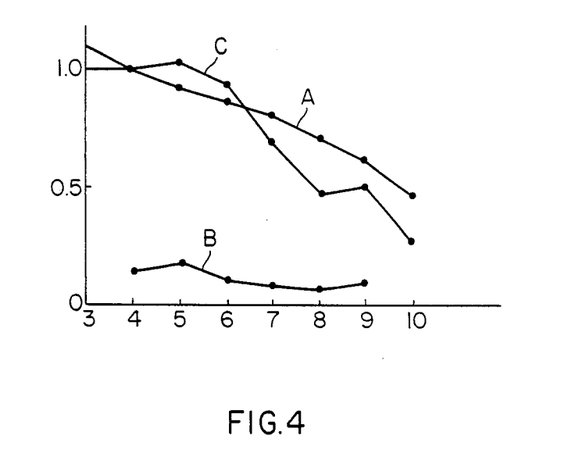
FIG. 4 shows the characteristic curves of the output of the sensor shown in FIG. 1 for various samples when using the principles of the invention described in my parent application.

The characteristic curve B in FIG. 4 shows an example of the results of the experiments carried out by using the sensor shown in FIG. 1. The Figure shows the relative values of the output signal 9a of the amplifier 9 in relation to the objects of the respective indicated colors. As is evident from the Figure, the output signal 9a shows the different values which depend upon the color, and discrimination of the five colors other than green is possible by the output signals of the amplifier. However, the difference between the output signals for red, violet, and blue is too small for discrimination between these colors. In addition, since the output signal for green is approximately the same as tht for violet, discrimination between red, violet, blue and green is very difficult.

As is clear from the above description, color discrimination by means of the conventional color mark sensor is difficult in at least four colors, namely, red, violet, blue and green.

Accordingly it is an object of the invention of the parent application to solve the above-described problems in the conventional method of determining the color of an object by detecting the energy of the reflected light from the object, and to provide a method of discriminating between many colors with good sensitivity.

To achieve this aim, a color discriminating method and sensor for determining the color of a particular object is provided, which comprises a transmitting unit for radiating light, focusing lenses and reflecting surfaces for converging, projecting and reflecting the light, one or more sharp cut filters which receive the light for spectral transmittance, and a photodiode for measuring spectral sensitivity. The photodiode converts the light to an electrical signal, which is delivered to an amplifier that amplifies the signal to produce signals discriminated according to the various colors of the sensed object. In our parent application the light energy, which is converted to the electrical signal by the photodiode, is determined by a spectral energy distribution of the light within a range between a lower limit wavelength of about 540 nm to 580 nm and an upper limit wavelength of at least 950 nm.

However, while this technique has proven quite satisfactory for glossy samples, it has proven less satisfactory for non-glossy samples.

Figure 3:
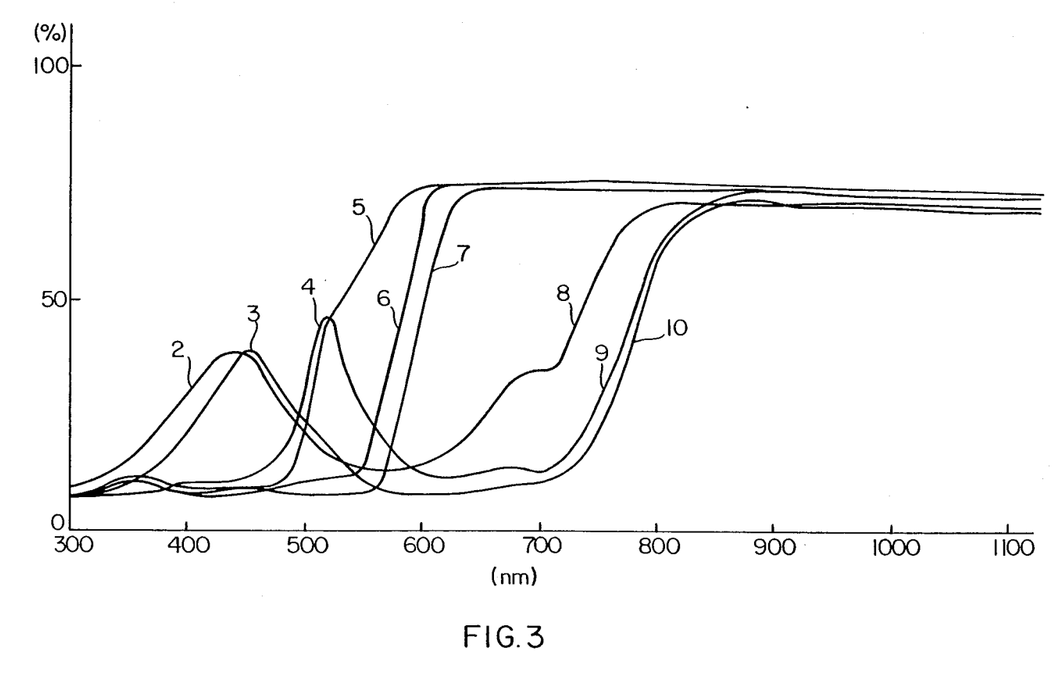

The spectral reflectance characteristics of object color are shown in FIG., 2 using a glossy sample and in FIG. 3 using a non-glossy sample, using reference color paper of the Practical Color Coordinate System issued by the Japan Color Laboratories. As shown, in these figures, even if the object colors are the same with respect to the reference color papers, the spectral reflectance characteristics are different in accordance with the surface condition of the object and the color temperature of the light source used for lighting.

In particuar although the glossy sample shown in FIG. 2 brought about a satisfactory characteristic as shown by the curve A in FIG. 4, the non-glossy sample shown in FIG. 3 showed a non-functional characteristic as indicated by curve C of FIG. 4. In particular, it has been found that difference between output signals of the amplifier for respective colors of white, yellow and orange is small and therefore it is considerably difficult to discriminate between these three colors. Although it is obvious from a comparison of FIG. 2 and FIG. 3, the peak values are almost the same at the wavelength of 600 nm or more in the yellow and orange for the non-glossy sample. Therefore, in the method of the parent patent application wherein the lower limit was a wavelength of 540 nm to 580 nm, the energy of wavelengtgh about 540 nm for the yellow component is partially cut out and discrimination is no longer possible. Although not shown, white has almost a flat spectral reflectance characteristic in the total range of wavelength. In the case of non-glossy samples, those tested have the reflectance of about 75% which is equal to N9.0 and it is difficult to discriminate between yellow and orange.

Accordingly, the method proposed in the parent application cannot adequately discriminate colors for the non-glossy sample and therefore an improved method would be desirable.

Accordingly, it is an object of the present invention to solve the above-described problems when determining the color of an object by detecting the energy of the reflected light from the object and to provide a method of discriminating between more colors with high sensitivity.

SUMMARY OF THE INVENTION

To attain this object, the present invention provides a method of discriminating more colors with good sensitivity by the detection of light energy which corresponds to all energies of the light within a predetermined wavelength range including the wavelengths higher than approximately 440 nm to 480 nm from the reflected light of the object irradiated with white light. Advantageously the light of wavelength above about 900 nm also is filtered out before detection.

BRIEF DESCRIPTION OF THE DRAWINGS

In FIGS. 2-4 and 6-13, the various curves or points shown are designated as follows:
FIG. 2:
2: Violet; 3: Blue; 4: Green;
5: Yellow; 6: Violet; 7: Red; 8: Green;
9: Blue; 10: Orange
FIG. 3:
2 Violet; 3: Blue; 4: Green;
5: Yellow; 6: Orange; 7: Green; 8: Violet;
9: Green; 10: Blue
FIG. 4:
3: White; 4: Orange; 5: Yellow;
6: Red; 7: Violet; 8: Blue; 9: Green; 10: Black
FIG. 6:
3: White; 4: Yellow; 5: Orange; 6: Red;
7: Violet; 8: Blue; 9: Green; 10: Black
FIG. 7:
3: White; 4: Yellow; 5: Orange; 6: Red;
7: Violet; 8: Blue; 9: Green; 10: Black
FIG. 8:
3: White; 4: Yellow; 5: Orange; 6: Red;
7: Violet; 8: Blue; 9: Green; 10: Black
FIG. 9:
3: White; 4: Yellow; 5: Orange; 6: Red;
7: Violet; 8: Blue; 9: Green; 10: Black
FIG. 10:
2: Violet; 3: Blue; 4: Green;
5: Yellow; 6: Red; 7: Orange; 8: Violet;
9: Blue; 10: Green; 11: Violet; 12: Blue;
FIG. 11:
2: Violet; 3: Blue; 4: Green;
5: Yellow; 6: Orange; 7: Red; 8: Violet;
9: Green; 10: Blue
FIG. 12:
3: Violet; 4: Blue; 5: Green; 6: White;
7: Yellow; 8: Orange; 9: Red; 10: Grey;
FIG. 13:
3 Blue; 4: White; 5: Yellow: 6: Orange;
7: Green; 8: Black; 9: Red; 10: Grey;
11: Violet

DETAILED DESCRIPTION OF THE INVENTION

Figure 5:
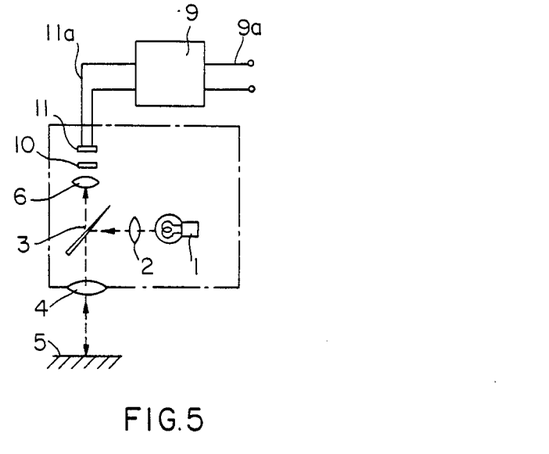
FIG. 5 is a block diagram showing the basic elements of a color mark sensor in accordance with the present invention.
Figure 6:
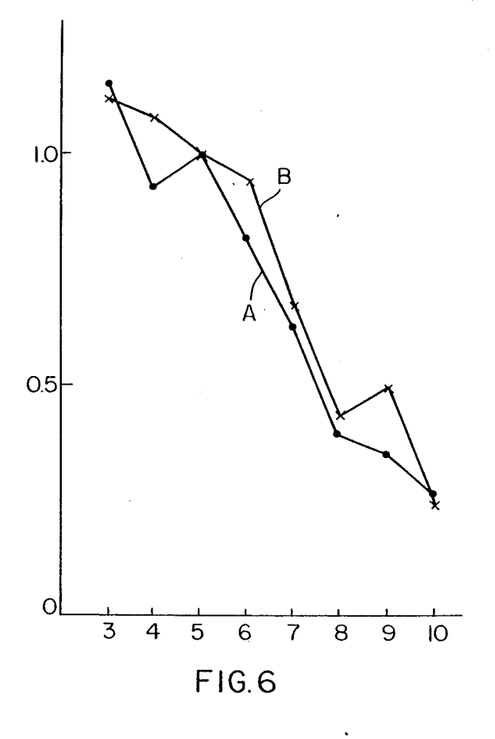
FIGS. 6 through 9 show amplifier output characteristics using various combinations of filters.
Figure 7:
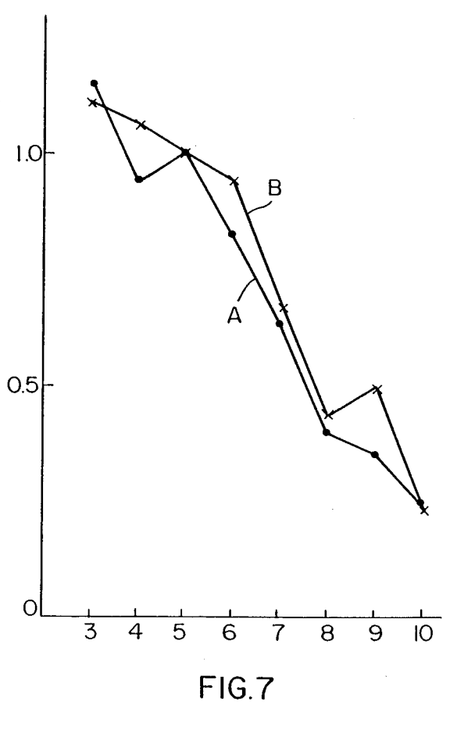
Figure 8:
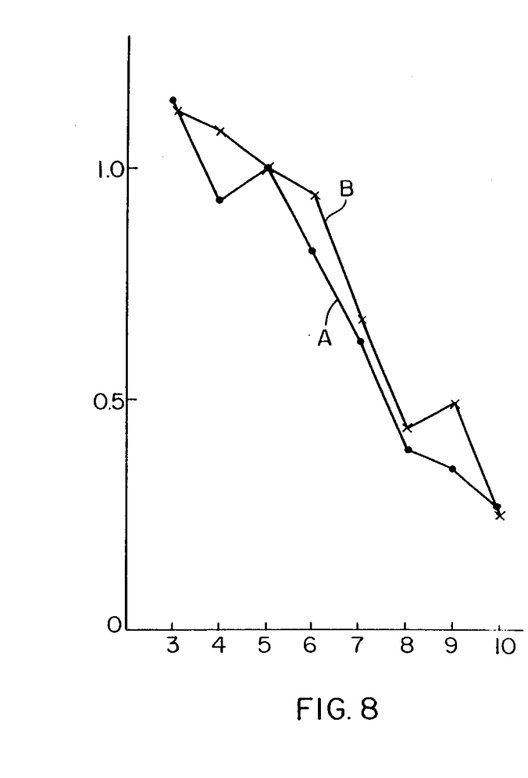
Figure 9:
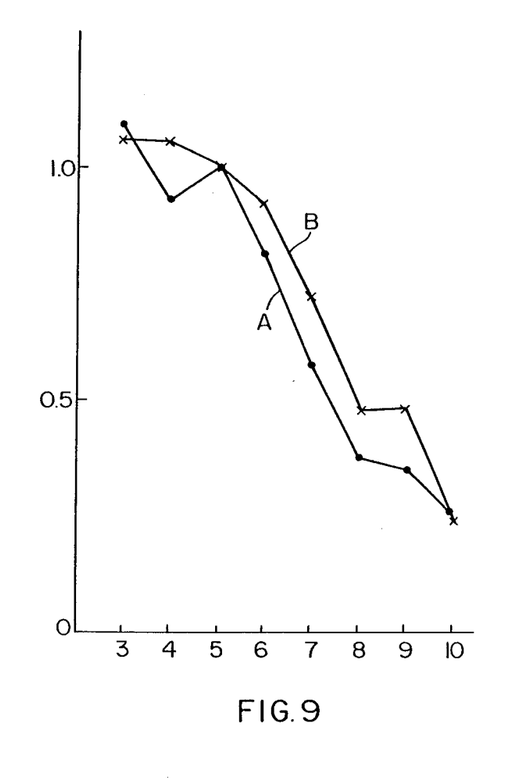

Referring to the drawings, FIG. 5 shows the structure of a color mark sensor which employs an embodiment of a color discriminating method according to the invention. In FIGS. 1 and 5, like reference numerals denote like elements. The sensor shown in FIG. 5 is different from that in FIG. 1 only in filter 10 and a Si photodiode 11. In this sensor, filter 10 is a combination of a sharp cut filter and a heat absorption filter where a "sharp cut" filter, as used herein means a filter having a sharp break or corner frequency with a steep roll off. The position of the filter 10 herein is not limited to the position shown in the Figure and it may be arranged at any position on the optical path bewen the light source 1 and the half mirror 3, or between the object 5 and the lens 6. Additionally the diode 11 is a silicon PIN photodiode.

From the characteristics shown in FIG. 2 and FIG. 3, it can be assumed that it is enough for the component of short wavelength, specifically the component of yellow, to be transmitted in order to efficiently discriminate the colors of both glossy and non-gossy samples. However, if only this short wave-length is transmitted, it can be estimated that it will become difficult to discriminate between the colors of green and blue in the case the of non-glossy sample shown in FIG. 3. Consequently, it also becomes necessary to restrict the compnents of longer wavelengths. In the light of such considerations, investigations have been made of combinations of filters for efficiently discriminating colors of samples having the spectral reflectance characteristics shown in FIG. 2 and FIG. 3 by changing the spectral sensitivity Y of the silicon photodiode 11 and the spectral transmittance X of the filter 10. Typical results are shown in FIG. 6 to FIG. 9.

In each of these figures, the characteristic curve A shows the result of glossy samples, while the curve B the result for non-glossy samples. These results have established that a desirable combination of filters is formed by one from the filters designated Y-44 to Y-48 and the other HA-30 or HA-50. The filters are not restricted only to the above combinations since other combinations having the same spectral characteristics as those of the above combinations can also be employed. Moreover, the filters designated HA-30 and HA-50 are thermal absorption filters. In case the spectral characteristic of photodiode 11 has its peak wavelength in the vicinity of 800-850 nm, the filter HA-50 is recommended, while for a peak in the vicinity of 900 nm, the filter HA-30 is recommended. For the results of FIG. 6 to FIG. 9, since the photodiode used had its peak wavelength in the vicinity of 850 nm, filter HA-50 has been employed. When any of filters Y-44 to Y-48 were used, there was no significant difference in the results.

Figure 10:
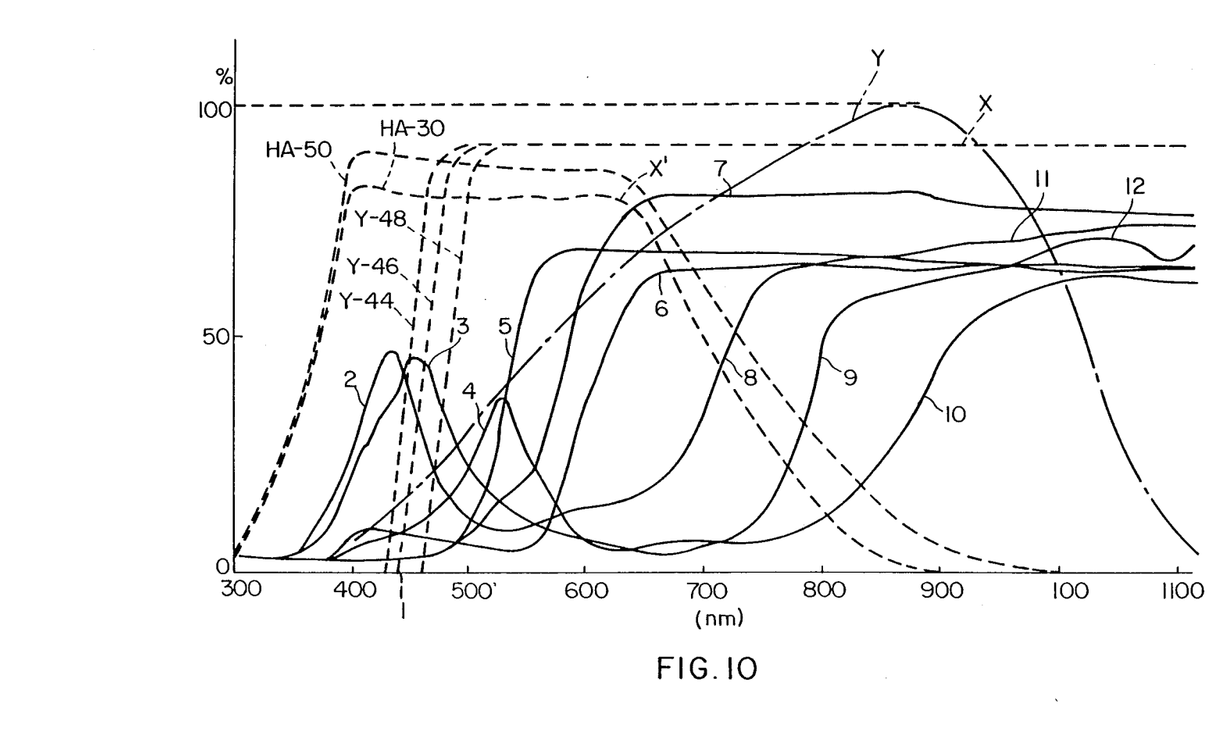
FIGS. 10 and 12 are graphs useful in explaining the invention for use with glossy samples.
Figure 11:
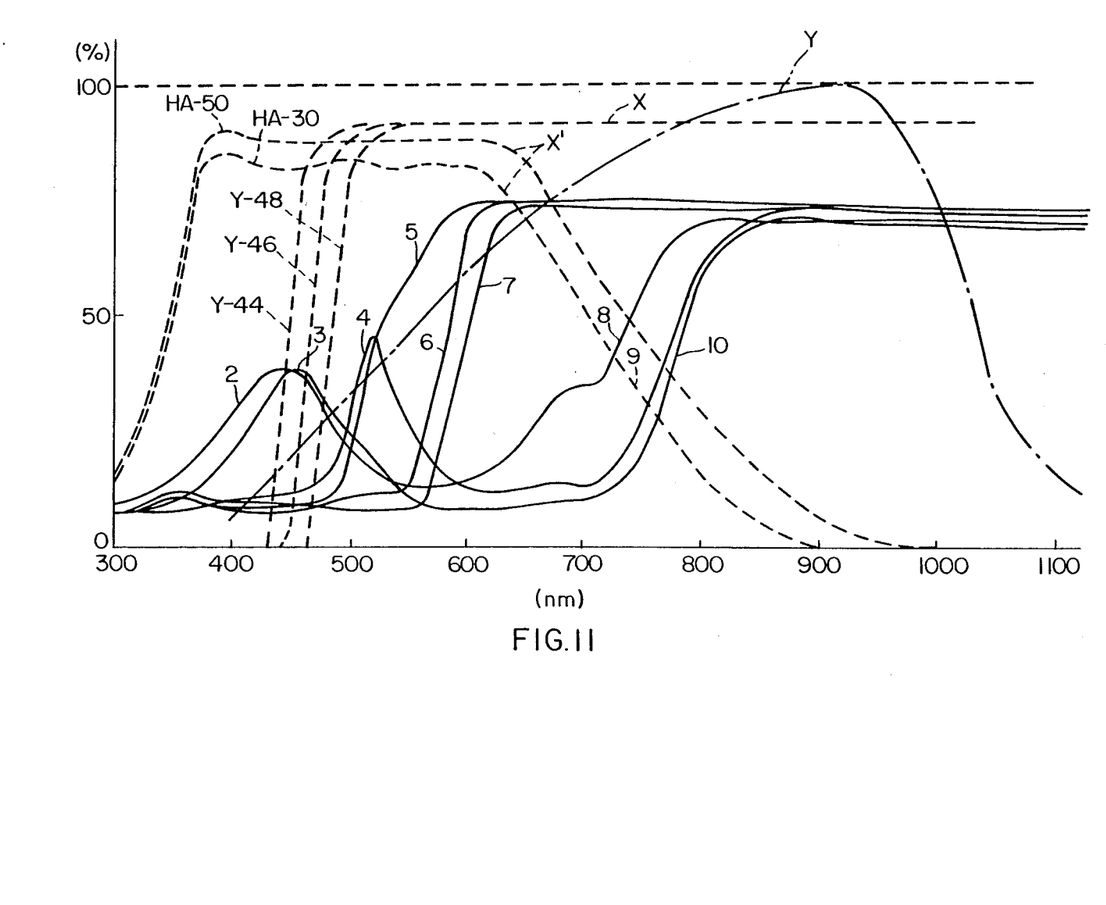
FIGS. 11 and 13 are graphs useful in explaining the invention for use with non-glossy samples.

FIG. 10 and FIG. 11 show the spectral transmittance X of the filter 10 shown in FIG. 5, the spectral sensitivity Y of photodiode shown in FIG. 5 and the reflectance of an object having the color as in the case of FIG. 2. For the FIG. 10 results, glossy reference color paper was used, while for the FIG. 11 results, non-glossy reference color paper was used. For the transmittance X shown in the figures, the characteristics of the filters Y-44, Y-46 and Y-48, and so labelled, have the transmittance limiting wavelengths of 440 nm, 460 nm and 480 nm, respectively. Namely, these filters have the spectral transmittance as a sharp cut filter which shows approximately zero transmittance for the light having the wavelength shorter than such transmittance limiting wavelength but almost constant transmittance for the light having the wavelength longer than such limiting wavelength. The filters HA-30 and HA-50 are thermal absorption filters having the spectral transmittance shown for the broken lines designated HA-30 and HA-50 in FIGS. 10 and 11.

Figure 12:
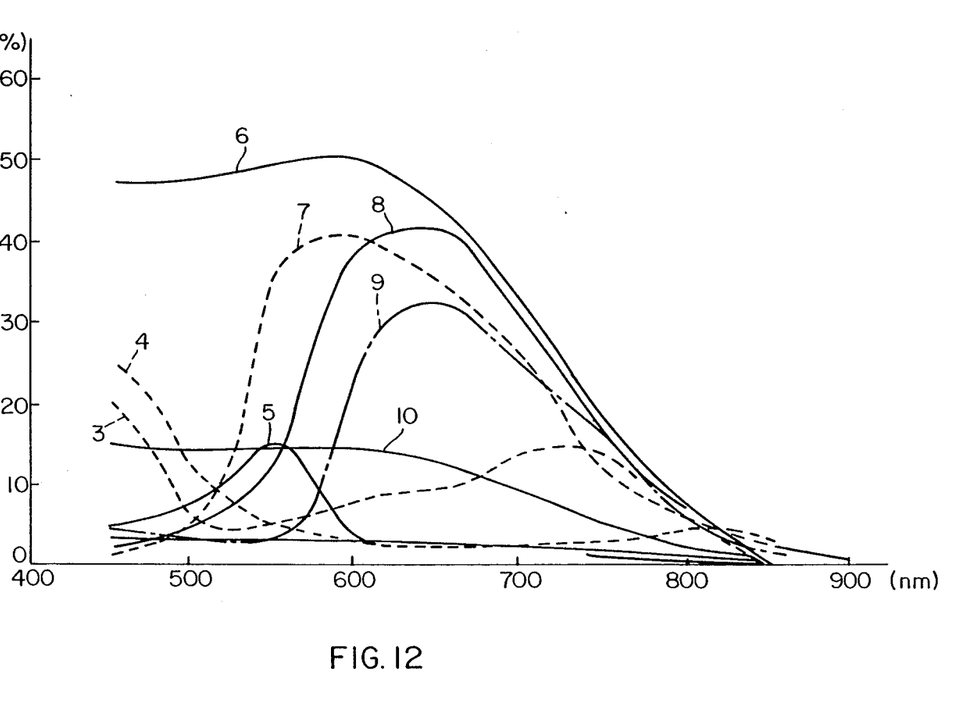
Figure 13:
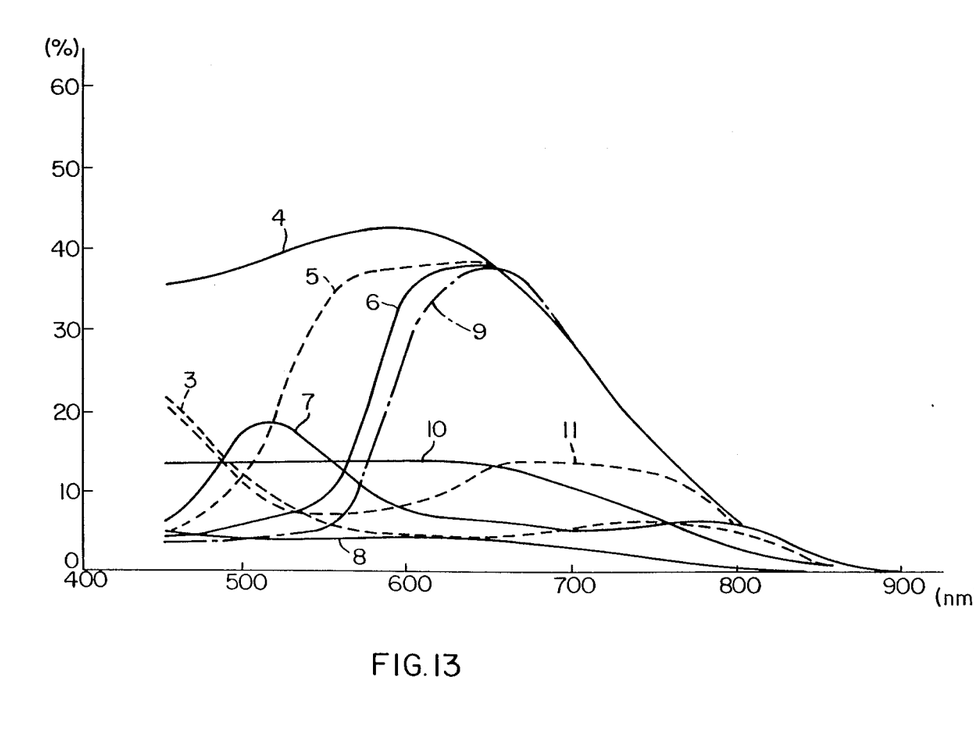

The filter 10 and photodiode 11 employed in the sensor shown in FIG. 5 respectively have the spectral characteristics shown in FIG. 10 and FIG. 11. Therefore, the spectral detection characteristic of the photodiode 11 in detecting light energy is equivalent to the characteristic of the product of the transmittance X and sensitivity Y. Moreover, the spectral energy distribution of the light detected when the photodiode 11 converts the reflected light of the object 5 into an electrical signal 11a is equivalent to the distribution depending on further multiplying the reflectance of object 5 by said product of X and Y. FIG. 12 and FIG. 13 respectively show the spectral sensitivity of the reference glossy color paper (FIG. 12) and non-glossy color paper (FIG. 13) for the sensor combining the filer spectral sensitivity and the sensitivity of the photodiode. As a conclusion, the output signal 11a of the photodiode shown in FIG. 5 takes the values corresponding to the area formed by the curve and the abscissa in FIG. 12 and FIG. 13 for each color of object 5. In other words, the light energy which is converted into an electrical signal by the photodiode 11 is essentially determined by the spectral energy distribution of the light within the wavelength range from about 460 nm to about 900 nm, and it can be assumed from the same figures that an output signal 11a of the photodiode is different for different colors of objects.

In the sensor shown in FIG. 5, the wavelength range of light detected by the photodiode 11 is limited by the spectral sensitivity of the photodiode 11 itself and the spectral transmittance of the filter 10, but such limitation of wavelength range may also be realized by the combination of filter 10 and a second filter which shows a very small transmittance for the wavelength above about 900 nm but a very large transmittance for the wavelength of below about 900 nm and it is desirable that the spectral sensitivity of the light receiving element which detects the light within such wavelength range be almost uniform in such a wavelenth range when the wavelength range is limited with such a pair of filters.

As described above, in the sensor shown in FIG. 5, the light energy detected by the photodiode is determined by the light in the wavelength range between the lower limit wavelength of about 460 nm and the upper limit wavelength of about 900 nm. If said upper limit wavelength is shifted toward wavelengths longer than 900 nm with an appropriate filter, sensitivity for the object color in the output signal 9a of the amplifier 9 is lowered, as is obvious from above description. However, in this case, if the receiver for receiving the signal 9a has a high resolution, the object color can be accurately discriminated even if the sensitivity of the signal 9a is lowered. Therefore, the upper limit wavelength preset in the sensor shown in FIG. 5 is not limited to 900 nm but may be shifted toward longer wavelengths. If this upper limit wavelength is shifted toward wavelengths shorter than 900 nm, the color discriminatin sensitivity in signal 9a is sharply lowered. Accordingly, it is important that the upper limit wavelength be set at least at about to 900 nm. In the preceding description, the lower limit wavelength is set to 460 nm, with the view of avoiding detection of the peak in the spectral energy distribution of the light reflected from an object in the wavelength range lower than such wavelength, as explained above. However, as is obvious from FIG. 10 and FIG. 11, elimination of the peak in the spectral energy distribution can be realized without significant decrease of the color discrimination sensitivity in the output signal 9a of amplifier, even when the lower limit wavelength is set to the wavelength range of about 440 nm to 480 nm. This has been confirmed experimentally. Consequently, the lower limit wavelength is not restricted to 460 nm and may be set to any given wavelength between about 440 nm to about 480 nm.

It is apparent that since the sensor shown in FIG. 5 discriminates colors by detecting the energy of light within the above-described wavelength range with the photodiode 11, it is important that the spectral energy distribution of the light from the light source 1 have a fixed and approximately predetermined value at least within this wavelength range.

As explained above, according to the present invention, in a sensor for determining the color of an object by irradiating the object with the light emitted from a light source and detecting the reflected light from said object, colors of object are determined by measuring the reflected light within the range where the lower limit wavelength is about 440 nm and the upper limit wavelength is about 900 nm.

We claim:

1. A color discrimination sensor for determining the color of a particular object, comprising:
   a transmitting unit having a radiation source for radiating light of predetermined spectral energy;
   a reflecting surface substantially aligned in the path of transmission of light;
   a first focusing lens for converging and projecting said light onto said reflecting surface;

a second focusing lens for converging and projecting the light received from said reflecting surface onto the object;

a third focusing lens for converging and projecting the light received from said object and transmitted through said second focusing lens;

a spectrally sensitive photodiode for receiving the spectrally transmited light and for converting the transmitted light into an electrical signal having a characteristic indicative of a wavelength corresponding to the color of the object; and means in the optical path between the radiation source and the photodiode for filtering the light and spectrally transmitting with little attenuation only light with wavelength between 440 nm and at least 900 nm.

2. The sensor of claim 1 in which the filtering means comprises a sharp cut filter and a heat absorption filter.

3. The sensor of claim 2 in which the sharp cut filter passes only light of wavelength longer than 440 nm and the heat absorption filter passes only light of wavelength shorter than 900 nm.

4. The method of determining the color of an object by irradiating the object with light from a white source and collecting the light reflected from the object with a silicon photodiode and comprising the current collected with a standard set of currents characterized in that the reflected light measured is limited to the wavelengths between a lower limit of from 440 nm to 480 nm and the upper limit of at least 900 nm.

5. The method according to claim 4 in which the light is filtered between the source and the photodiode by being passed through one filter which does not transmit light below between about 440 nm and 480 nm and another filter which does not transmit light above about 900 nm.

* * * * *